United States Patent
Pospesel et al.

(10) Patent No.: US 7,099,922 B2
(45) Date of Patent: Aug. 29, 2006

(54) METHOD AND SYSTEM FOR SIMULTANEOUS MANAGEMENT OF MULTIPLE TOKENS ON A COMMUNICATION RING

(75) Inventors: Kirk D. Pospesel, Palenville, NY (US); Thomas F. Dubois, New Paltz, NY (US); Dean A. Liberty, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/055,335

(22) Filed: Jan. 23, 2002

(65) Prior Publication Data
US 2003/0140109 A1    Jul. 24, 2003

(51) Int. Cl.
G06F 15/177    (2006.01)
G06F 15/16    (2006.01)

(52) U.S. Cl. .................. 709/208; 709/220; 709/250
(58) Field of Classification Search ................ 709/225, 709/208
See application file for complete search history.

(56) References Cited

U.S. PATENT DOCUMENTS

| | | | |
|---|---|---|---|
| 4,602,365 A | 7/1986 | White et al. | |
| 4,680,757 A | 7/1987 | Murakami et al. | |
| 5,228,027 A | 7/1993 | Yamaguchi | |
| 5,235,593 A | 8/1993 | Grow et al. | |
| 5,305,306 A | 4/1994 | Spinney et al. | |
| 5,444,847 A * | 8/1995 | Iitsuka | 710/107 |
| 5,457,683 A * | 10/1995 | Robins | 370/258 |
| 5,481,538 A | 1/1996 | Yang et al. | |
| 5,548,731 A | 8/1996 | Chang et al. | |
| 5,634,138 A * | 5/1997 | Ananthan et al. | 710/21 |
| 5,654,969 A | 8/1997 | Wilhelmsson | |
| 5,657,315 A | 8/1997 | Waclawsky et al. | |
| 5,666,497 A * | 9/1997 | Milhaupt et al. | 710/305 |
| 5,689,678 A * | 11/1997 | Stallmo et al. | 711/114 |
| 5,712,983 A * | 1/1998 | Vergnaud et al. | 709/250 |
| 5,764,634 A | 6/1998 | Christensen et al. | |
| 5,764,896 A | 6/1998 | Johnson | |
| 5,805,914 A * | 9/1998 | Wise et al. | 382/232 |
| 5,909,559 A * | 6/1999 | So | 710/307 |
| 5,948,089 A | 9/1999 | Wingard et al. | |
| 5,970,510 A | 10/1999 | Sher et al. | |
| 6,005,869 A * | 12/1999 | Sakai et al. | 370/452 |
| 6,185,644 B1 * | 2/2001 | Farmwald et al. | 710/301 |
| 6,260,088 B1 * | 7/2001 | Gove et al. | 710/100 |
| 6,275,864 B1 * | 8/2001 | Mancusi et al. | 709/250 |
| 6,310,885 B1 * | 10/2001 | Mizuguchi et al. | 370/450 |

OTHER PUBLICATIONS

Tanenbaum, A., "Computer Networks," Aug. 3, 1996, Prentice-Hall International, Inc., Amsterdam, NL XP002241957, ISBN: 0-13-349945-6, pp. 292-295.

(Continued)

*Primary Examiner*—Rupal Dharia
*Assistant Examiner*—Ranodhi Serrao
(74) *Attorney, Agent, or Firm*—Lawrence D. Cutter; Kevin M. Jordan; Fleit, Kain, Gibbons, Gutman, Bongini & Bianco P.L.

(57) ABSTRACT

A method, an apparatus and computer readable medium for simultaneous communication over a bus in a master/slave agent network topology. Each communication agent on the network is either a master agent or slave agent with an input and an output. In one embodiment, the input and the output are latches. The method permits the number of tokens on the ring to be equal to up to one less than the total number of agents on the ring.

17 Claims, 12 Drawing Sheets

OTHER PUBLICATIONS

IBM Technical Disclosure Bulletin, "Token Ring-Based Distributed Lock Manager," vol. 30, No. 7, pp. 263-266, Dec. 1987.

IBM Technical Disclosure Bulletin, "Enabling Multimedia Communications Over the Token Ring," vol. 36, No. 7, pp. 495-496, Jul. 1993.

IBM Technical Disclosure Bulletin, "Isochronous Transmissions on Top of Token Ring LAN," vol. 36, No. 8, pp. 145-150, Aug. 1993.

IBM Technical Disclosure Bulletin, "Multiple Independent Channels for LAN Adapters," vol. 39, No. 2, p. 381, Feb. 1996.

A. Tanenbaum, "Computer Networks", Prentice Hall International; Aug. 3, 1996; p. 292, Paragraph 4.3.3—p. 294, Paragraph 2, XP002241957.

* cited by examiner

T-6

METHOD AND SYSTEM FOR SIMULTANEOUS MANAGEMENT OF MULTIPLE TOKENS ON A COMMUNICATION RING

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

BACKGROUND OF THE INVENTION

1. Field of the Invention

This invention generally relates to the field of computer networks comprising a plurality of computers and more particularly to computer networks that communicate information using a token-based protocol while connected on a ring or bus.

2. Description of the Related Art

Computer networks allow for the connected devices to communicate with each other. There are three basic types of networks that are defined based on the proximity of the computer to a peripheral device. The smallest is a PAN (Personal Area Network) An example of a PAN is a home computer using the USB (Universal Serial Bus) method for connecting a computer, printer, scanner, and more. This PAN is used to communicate with each other as long as they are in close proximity.

Communication is based on a serial bus and has several limitations one of which being the inability to do simultaneous communications. Accordingly there exist a need for communications, which allow improved simultaneous networks.

In a typical business environment many offices are connected together so that the computers, printers, and associated equipment can communicate together. This configuration is known as a LAN (Local Area Network). There are two widely deployed types of LANs. One type of LAN is Ethernet Net (IEEE 802.3) and the other type of LAN is Token Ring (IEEE 802.5) networks. The Ethernet network is more widely deployed, because it is typically less expensive to deploy. However, if several communication devices contend for communication at the same time, bottlenecks occur during which all devices except one device must "Backoff" or hold-off communicating until the one device completes the communication. Then another device starts communicating until all devices are complete. This is a problem with "simultaneous" communications. In an Ethernet network topology, the aggregated bandwidth of the network cannot approach the incremental bandwidth due to the lack of controlled loading.

In contrast, to an Ethernet network topology, a Token Ring does allow for controlled loading. As the name implies, a Token Ring network is based on token passing, for higher shared bandwidth, and avoids collisions based on the control of the tokens.

These LAN standards of Ethernet network and Token Ring network although both useful are not without their shortcoming. One shortcoming is that both Ethernet and Token Ring networks do not allow for simultaneous communications. Accordingly there exists a need to provide simultaneous communications and to improve communication bandwidth.

As stated above, the cost of network deployment is often a major factor in adoption of a network topology. Other solutions in the prior art for simultaneous communications that require significant additional costs are not desirable because of the high cost of adoption. Accordingly, there is a need for a method and apparatus to provided simultaneous communications at a reasonable cost.

A WAN (Wide Area Network), as the name implies, widely separates computers and computer equipment. There are several methods of connecting these computers. The Internet is by far the most popular. Network contention with other computers while using a WAN is controlled by having simultaneous connections of varying connections speed and feed rates. Stated differently a computer typically communicates using a WAN simultaneously with other computers, however the communications can take a long time due to the extended distance between communicating units. Accordingly there exist a need for a method and apparatus that permits simultaneous communications while being part of a LAN.

SUMMARY OF THE INVENTION

Briefly, according to the present invention, disclosed is a method, an apparatus and computer readable medium for simultaneous communication over a bus in a master/slave agent network topology. Each communication agent on the network is either a master agent or slave agent with an input and an output. In one embodiment, the input and the output are latched. The method permits more than one token to be on the ring at any given time. A master agent can start a request a slave agent cannot start a request. When a master agent receives a token from the ring and it has a pending request, the master agent removes the token from the ring and issues its request. The token is not put back onto the ring until the master agent receives the response to the request from the designated slave agent. That is, the token time slot is used for a complete, round trip transaction, rather than simply the sending of a request or response. When the slave agent receives a request, it generates the response and puts it on the ring as soon as it is possible, without waiting for a token. The present invention, using the technology described herein, supports multiple master agents coupled to the same bus.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1A:
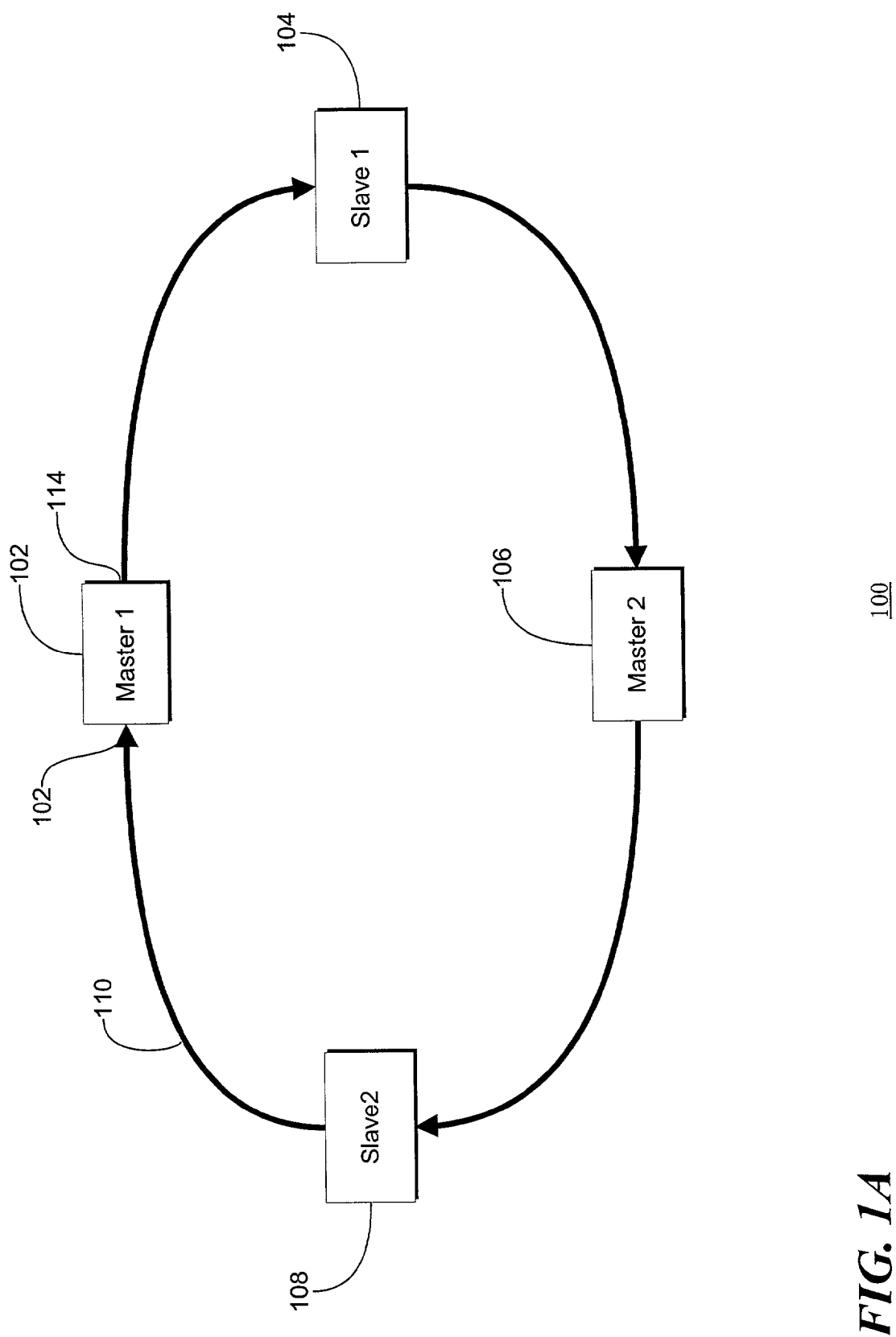
FIG. 1A is a block diagram of a typical Token Ring network illustrating two Master Agents and two Slave Agents, according to the present invention.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing, like numerals refer to like parts through several views.

GLOSSARY OF TERMS USED IN THIS DISCLOSURE

AGENT—a set of data communications logic which connects a requester (master) or responder (slave) to a communications fabric.

BUS—a wire or group of wires used to transmit data and control between two nodes. The term bus is used interchangeable with the term RING in this invention for a closed loop BUS topology.

HETEROGENOUS—networks based on standards-conforming hardware and software interfaces used in common by different products, thus allowing them to communicate with each other. The Internet itself is an example of a heterogeneous network.

LAN—A local area network (LAN) is a group of computers and associated devices that share a common communications line and typically share the resources of a single processor or server within a small geographic area (for example, within an office building). Usually, the server has applications and data storage that are shared in common by multiple computer users. A local area network may serve as few as two or three users (for example, in a home network) or many as thousands of users (for example, in an FDDI network).

MASTER/SLAVE—Master: A communicating entity, which generates requests and consumes responses. A master connects to the communications fabric through a Master Agent. Slave: A communicating entity, which consumes requests and produces responses. A Slave connects to the communications fabric through a Slave Agent.

RING—a closed-loop topology that forms a logical ring. A Token Ring topology forms a logical ring but has the cable layout of a star topology, with a central hub. A true ring topology is rare since it is easier to plan and install a star topology.

ROUND-TRIP—is a complete send and receive transaction from a Master Agent over the ring or bus comprising both a request and a response. A Slave Agent cannot start a request.

SIMULTANEOUS—communications on a bus in which more that one AGENT either Master Agent or Slave Agent, communicates at the same time independent of a clock signal. Contrast with Isochronous and synchronous. The communication occurs between two or more agents coupled to the bus so that a request and reply is accomplished in one round-trip or cycle of the bus.

TOKEN RING NETWORK—Token Ring network is a local area network (LAN) in which all computers are connected in a ring or star topology and a binary digit, or token passing scheme is used in order to prevent the collision of data between two computers that want to send messages at the same time. The Token Ring protocol is the second most widely-used protocol on local area networks after Ethernet. The IBM Token Ring protocol led to a standard version, specified as IEEE 802.5. Both protocols are used and are very similar. The IEEE 802.5 Token Ring technology provides for data transfer rates of either 4 or 16 megabits per second. Very briefly, here is how it works:

Empty information frames are continuously circulated on the ring.

When a computer has a message to send, it inserts a token in an empty frame (this may consist of simply changing a 0 to a 1 in the token bit part of the frame) and inserts a message and a destination identifier in the frame.

The frame is then examined by each successive workstation. If the workstation sees that it is the destination for the message, it copies the message from the frame and changes the token back to 0.

When the frame gets back to the originator, it sees that the token has been changed to 0 and that the message has been copied and received. It removes the message from the frame.

The frame continues to circulate as an "empty" frame, ready to be taken by a workstation when it has a message to send.

WAN—(wide area network) is a geographically dispersed telecommunications network and the term distinguishes a broader telecommunication structure from a local area network (LAN). A wide area network may be privately owned or rented, but the term usually connotes the inclusion of public (shared user) networks.

RING TOPOLOGY AND PACKET DEFINITION

FIG. 1A is a block diagram of a typical Token Ring network 100 illustrating two Master Agents 102 and 106 (M1 and M2) and two Slave Agents 104 and 108 (S1 and S2), according to the present invention. Each agent 102, 104, 106, and 108 is connected by a serial or parallel bus or ring 110. Master Agent 1 102 is connected from the parallel ring 110 at port 112, and is connected to the ring 110 at port 114.

Figure 1B:
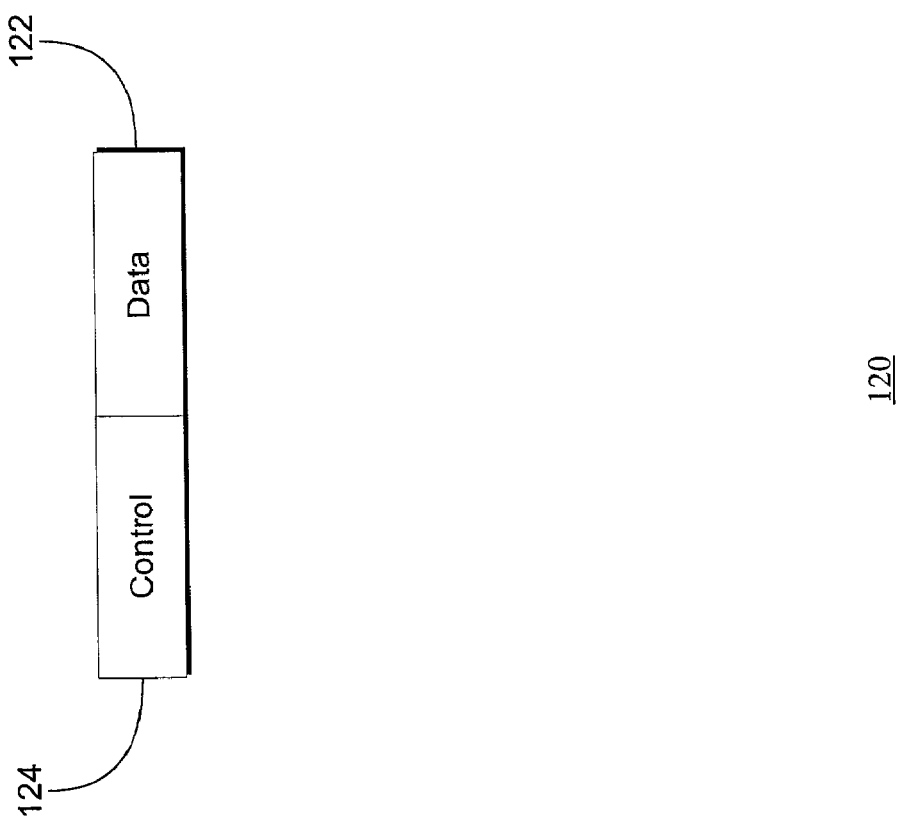
FIG. 1B is a block diagram of a packet, illustrated as an example of how data and control is defined, according to the present invention.

FIG. 1B is a block diagram of a packet 120, illustrated as an example of how data bits 122 and control bits 124 are defined, according to the present invention. In this embodiment, the data packet 120 is shown to be 64 bits wide, or 8 bytes. Associated with each byte is a parity bit. This results in a total data bit width of 72 bits. It is important to note that the total number bits and the allocation of data bits 122 and control bits 124 may change and is not limiting to the teachings of the present invention.

OVERVIEW OF PROTOCOL

A typical Token Ring network with Master/Slave Agent communicating devices, a Master Agent can issue a new request only when it has the token, as with the normal Token Ring protocol. However, there are several departures from the normal token protocols.

A round trip is a round trip from a Master Agent over the ring or bus comprising both a request and a response. A Slave Agent cannot start a request.

When a Master Agent receives a token from the ring and it has a pending request, the Master Agent removes the token from the ring and issues its request. The token is not put back onto the ring until it receives the response to the request from the designated Slave Agent. That is, the token time slot is used for a complete, round trip transaction, rather than simply the sending of a request or response. This avoids deadlock by pre-allocating a slot for the slave response.

When the Slave Agent receives a request, it generates the response and puts it on the ring as soon as it is possible, without waiting for a token. The token is used by the Master Agent to initiate a complete round trip. The token used by the Master Agent reserves space for both the request and the response.

More than one token can be circulating on the ring at any time.

AGENT INTERFACE

Figure 2:
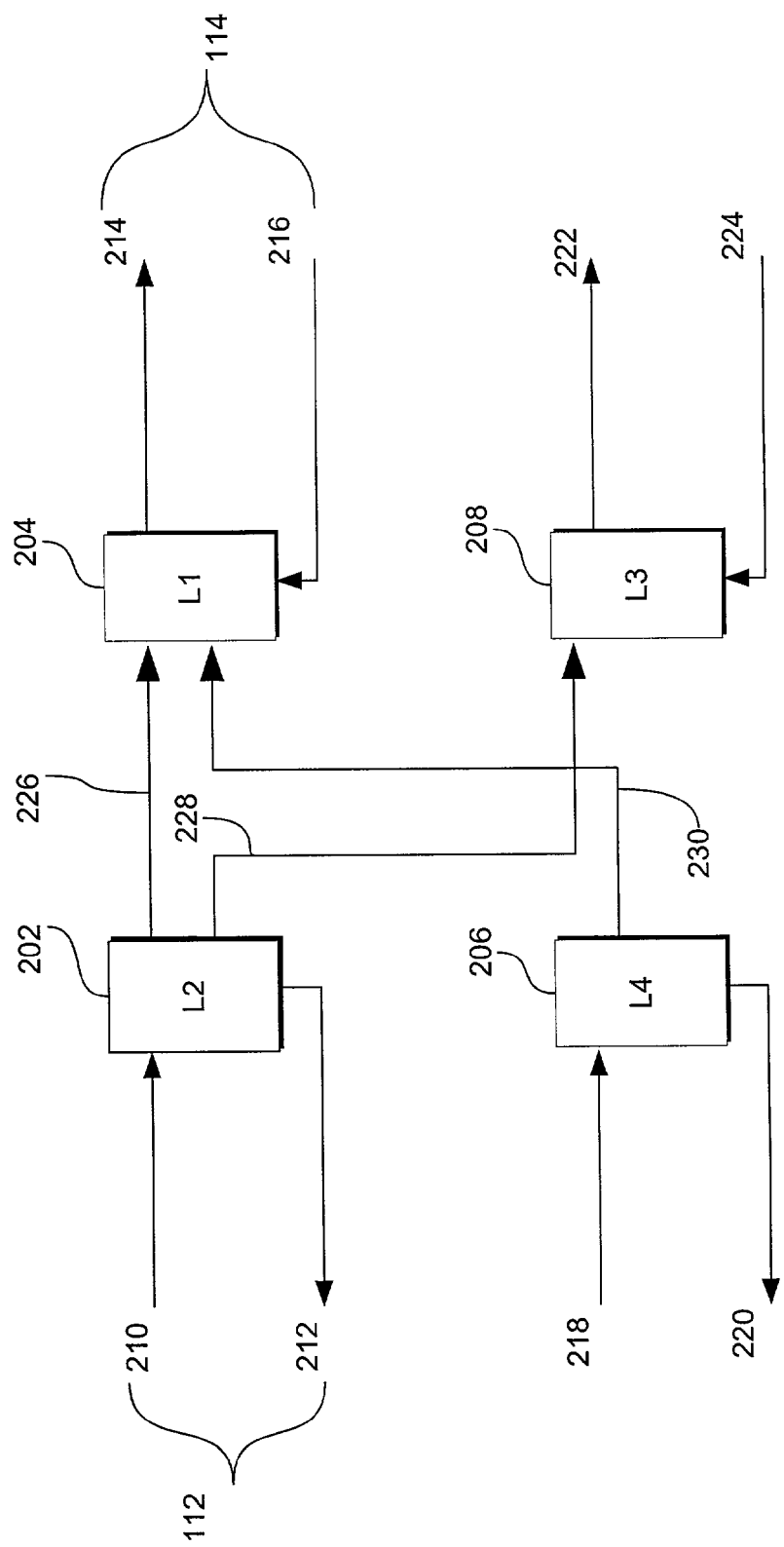
FIG. 2 is a logic block diagram, illustrating an embodiment of an interface between the bus and an agent, which may be a Master Agent or Slave Agent, according to the present invention.

Turning now to FIG. 2, shown is a logic block diagram, illustrating an embodiment of an interface 200 between the bus 110 and an agent (102, 104, 106, and 108), which may be a Master Agent (102 and 106) or Slave Agent (104 and 108). A L2 latch 202, is connected to the previous agent (not shown) at port 112. It receives the control and data information in the packet 120 via lines 210. Once the control bits 124 is latched in the L2, the CTS (Clear To Send) 212 signal is sent back upstream to the previous agent (not shown). A decision is made based on the received control bits 124 in L2 as to whether the associated data is for this agent 200. If it is, the control bits 124 are passed on to the L3 latch 208 via line 228 for processing by this agent. This described the receiving of control bits and data bits for this agent.

If the agent has information to be put on to the ring 218, the information is presented to the L1 latch 204 by the L4 latch 206 using the connection 230. This information in turn is presented onto the bus 110 at port 114. If this is the completion of a send/receive round trip, the Master Agent (102 and 106) presents it's token back (not shown) out on to the bus 110, using the same path 230. This described the transmitting of control and data onto the bus 110 at port 114 from an agent.

If the data that was received by the L2 latch 202, is not for this agent it is presented to the L1 latch 204 using connection 226. The L1 latch 204 will pass information that is not identified for this agent. This is accomplished by presenting this information on to the bus 110 via path 214 at port 114 after the downstream agent's L2 (not shown) presents a CTS signal 216 to the L1 latch 204.

If a sending Master Agent received a request back from the bus 110 with out being processed by another agent, the sending Master Agent may retry, or do a timeout and try again later.

DATA FLOW AROUND THE RING

Turning now to FIGS. 3 through 9, shown is a series of logical diagrams illustrating simultaneous communication for an exemplary time period T0–T6 for a ring network topology 100 of FIG. 1, according to the present invention.

A labeling convention for each alphanumeric from the left-to-right, where # denotes a place holder for FIGS. 3–9 is as follows:

the first number is the number of the figure e.g., 3#### and 8####;

next, the alpha numeric is the type of agent and it's number, where M is for Master Agent and S is for Slave Agent, e.g., #M1## and #S2## next, the label is for a latch L and the number of the latch ###L2 and ###L3

The cable nomenclature has six place holder as follows, i.e., ###–##. The first the number is the figure number. The next number are labels of the connected agents where "M" is for Master Agent and "S" is for Slave Agent, ###–##, and the "–" denotes from-to, e.g. 4M2–S2 is a cable from FIG. 4, Master Agent 2 (M2) to Slave Agent 2 (S2).

TIME T0

Figure 3:
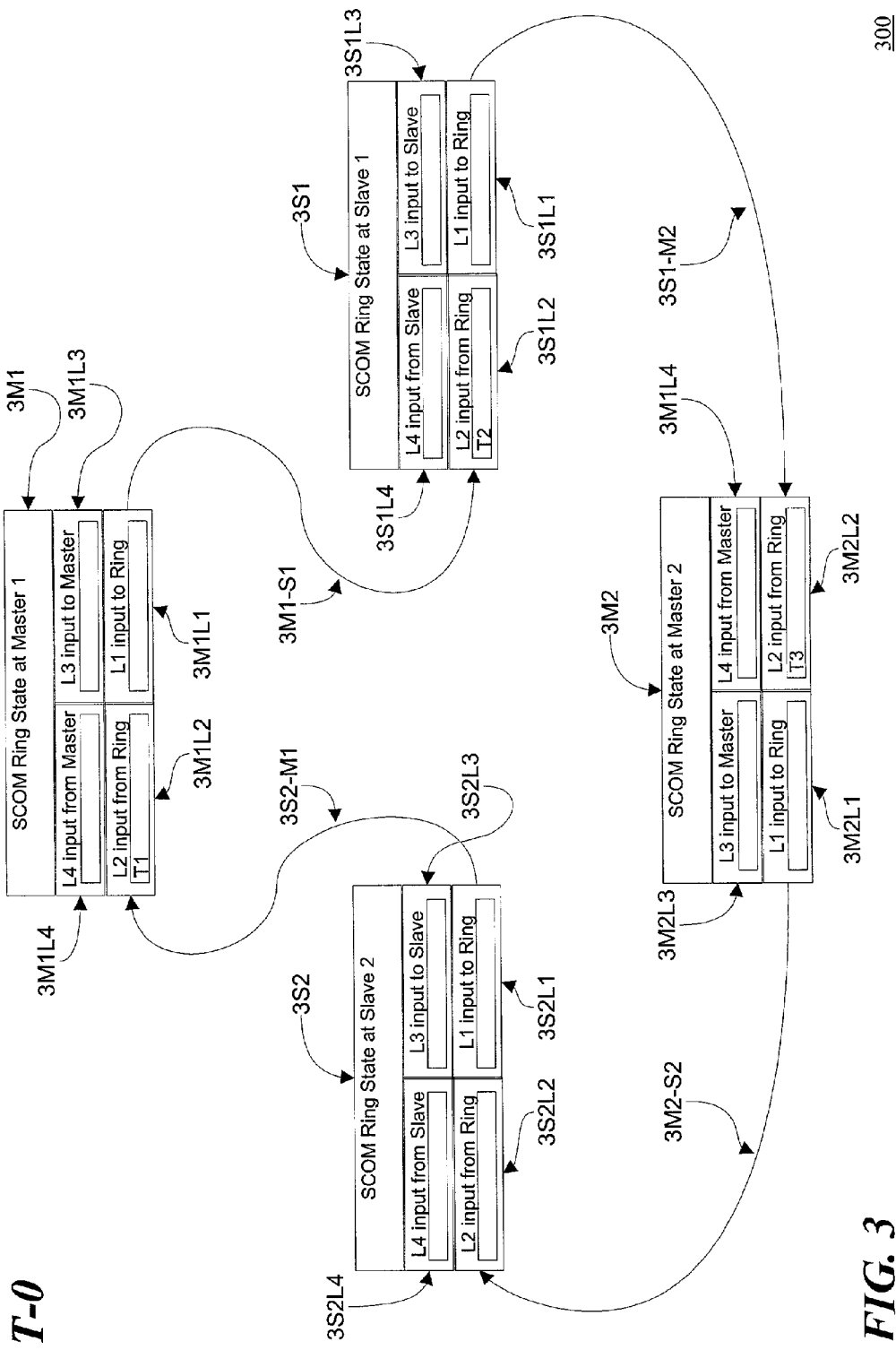
FIGS. 3 through 9, are a series of logical diagrams illustrating simultaneous communication for an exemplary time period T0–T6 for a ring network topology of FIG. 1, according to the present invention.

Referring to FIG. 3, shown are four ring agents and the four interconnecting cables. At this time defined as T-0, the ring agents have just been powered up or have been reset. Reset initializes n−1 agents with tokens. Where n is the total number of ring agents. In this example, there are 4 ring agents (102, 104, 106, and 108) so the maximum number of tokens would be 3.

Master Agent 1's L1 3M1 L1, L3 3M1L3 and L4 3M1L4 are all blank. L2 3M1L2 has a-token, labeled T1.

Slave Agent 1's L1 3S1L1, L3 3S1L3 and L4 3S1L4 are all blank. L2 3S1L2 has a token, labeled T2.

Master Agent 2's L1 3M2L1, L3 3M2L3 and L4 3M2L4 are all blank. L2 3M2L2 has a token, labeled T3.

Slave Agent 2's L1 3S2L1, L3 3S2L3 and L4 3S2L4 are all blank. L2 3S2L2 is also blank. There must be one fewer tokens than ring agents circulating on the bus 110.

TIME T1

Figure 4:
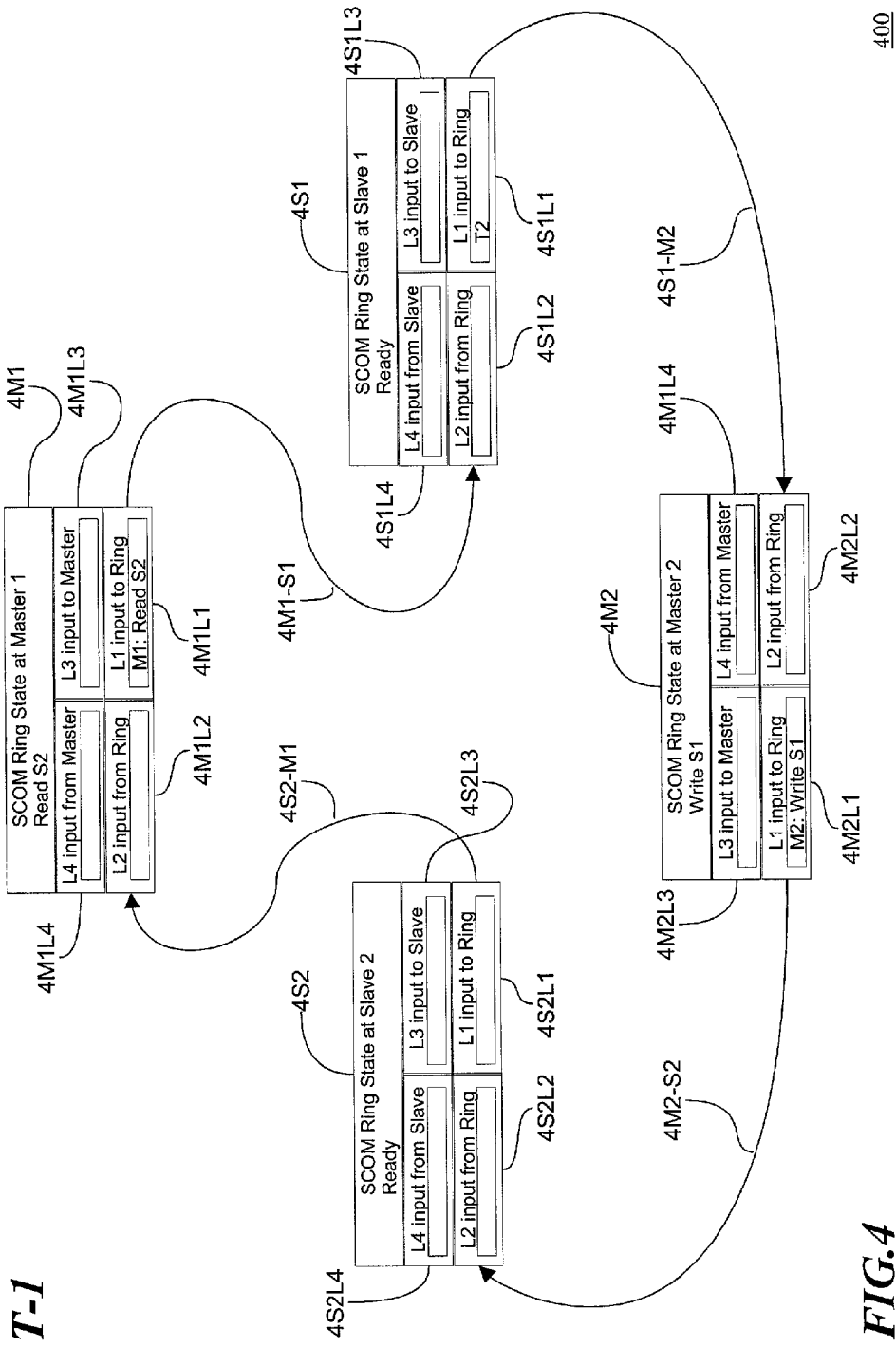

Turning now to FIG. 4, shown are four ring agents and the four interconnecting cables. At this time defined as T-1, the Master Agents have reacted simultaneously to their individual control by pulling in the given tokens and placing their request on the bus 110 as described below.

Master Agent 1 pulls in the T1 token and placed the READ S2 request on the bus 110 Therefore:

L1 4M1L1 has the request M1: Read S2 in its register.
  L2 4M1L2 has a blank in its register
  L3 4M1L3 has a blank in its register
  L4 4M1L4 has a blank in its register Slave Agent 1 has received the T2 token but cannot initiate any requests, therefore:

L1 4S1L1 has the T2 token in its register
  L2 4S1L2 has a blank in its register
  L3 4S1L3 has a blank in its register
  L4 4S1L4 has a blank in its register.

Master Agent 2 has pulled in the T3 token and placed the request WRITE S1 on the bus 110. Therefore:

L1 4M2L1 has the command M2: WRITE S1 in its register
  L2 4M2L2 has a blank in its register
  L3 4M2L3 has a blank in its register
  L4 4M2L4 has a blank in its register.

Slave Agent 2 has not received any tokens and therefore:

L1 4M2L1 has a blank in its register
  L2 4M2L2 has a blank in its register
  L3 4M2L3 has a blank in its register
  L4 4M2L4 has a blank in its register.

This completes the description of T-1.

TIME T2

Figure 5:
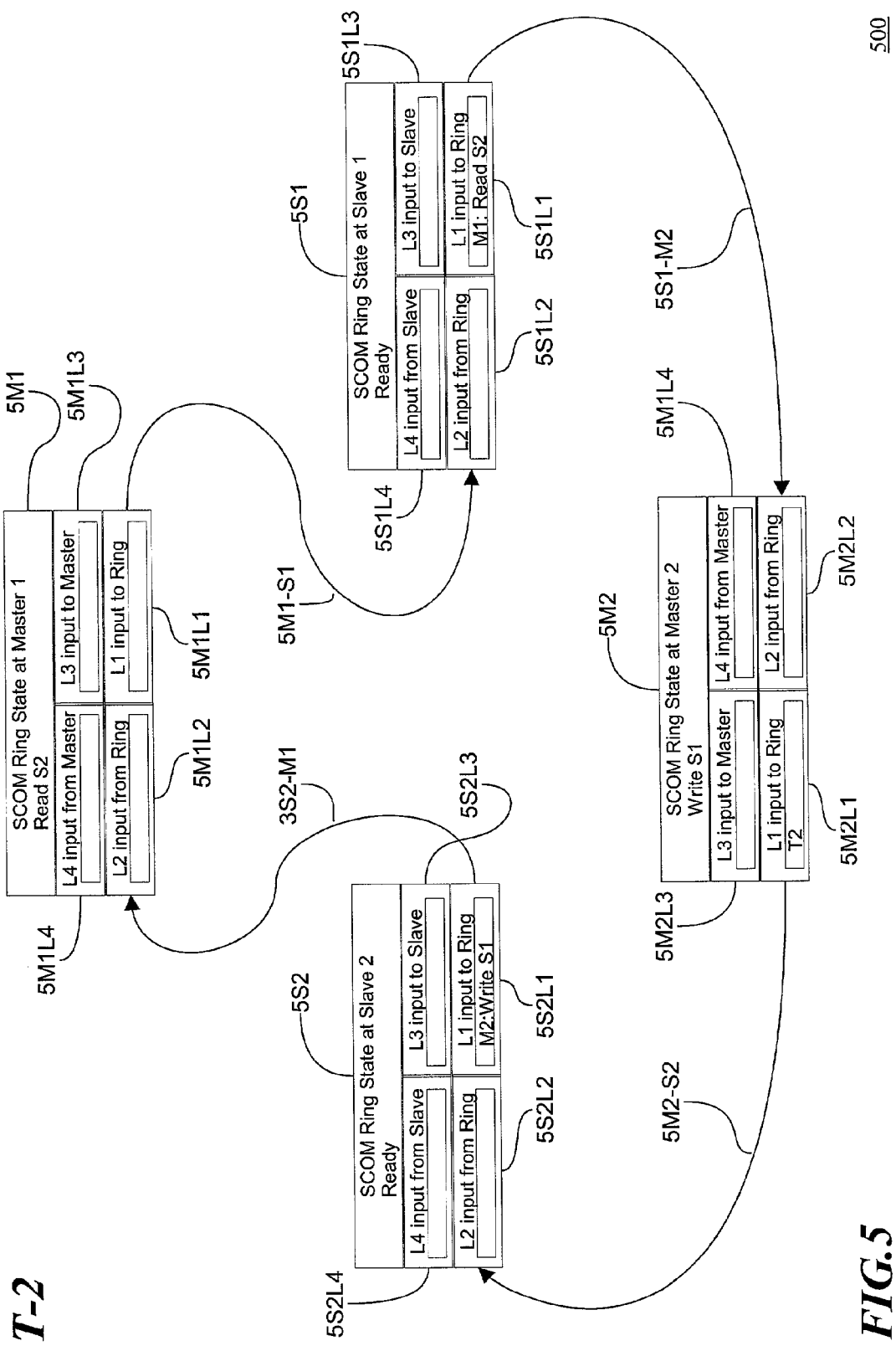

Referring to FIG. 5, shown are four bus 110 agents and the four interconnecting cables. At this time defined as T-2, the bus 110 agents have just completed a transmission of their individual content to the next bus 110 agent.

Master Agent 1 has received blank information from the Slave Agent 2 agent. Therefore:
  L1 5M1L1 has a blank in its register
  L2 5M1L2 has a blank in its register
  L3 5M1L3 has a blank in its register
  L4 5M1L4 has a blank in its register.

Slave Agent 1 has received the information from the Master Agent 1 agent, and is ready for the next communication cycle. This command is not for this Slave Agent. Therefore:
  L1 5S1L1 has the command M1: read S2 in its register
  L2 5S1L2 has a blank in its register
  L3 5S1L3 has a blank in its register
  L4 5S1L4 has a blank in its register.

Master Agent 2 has received the information from the Slave Agent 1 agent. The information is the T2 token. Therefore:
  L1 5M2L1 has the T2 token
  L2 5M2L2 has a blank in its register
  L3 5M2L3 has a blank in its register
  L4 5M2L4 has a blank in its register.

Slave Agent 2 has just received the information from the Master Agent 2 agent. Therefore:
  L1 5S2L1 has the M2: Write S1 in its register
  L2 5S2L2 has a blank in its register
  L3 5S2L3 has a blank in its register
  L4 5S2L4 has a blank in its register.

TIME T3

Figure 6:
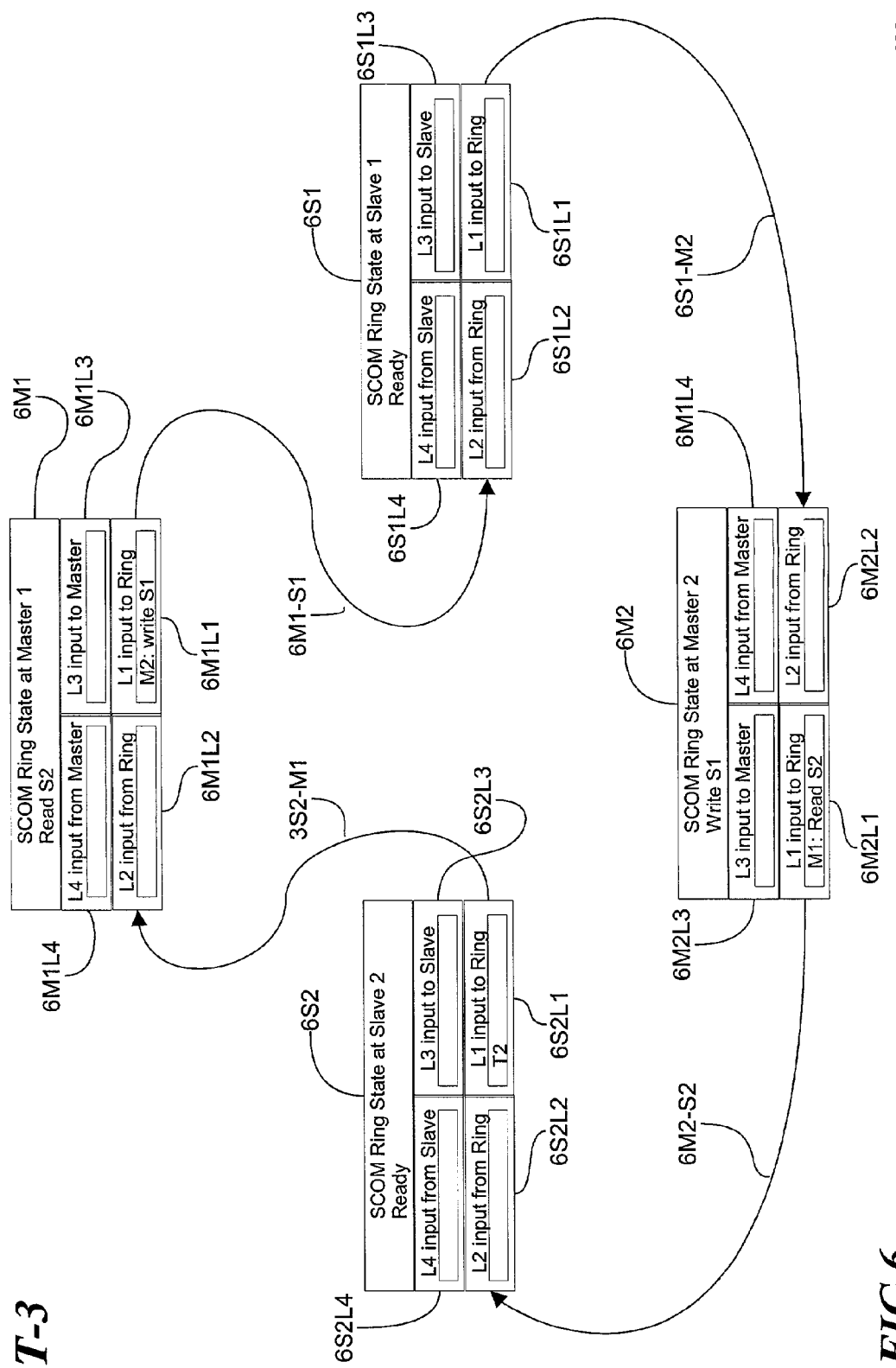

Referring to FIG. 6, shown are four bus 110 agents and the four interconnecting cables. At this time defined as T-3, the bus 110 agents have just completed another transmission of their individual content to the next bus 110 agent.

Master Agent 1 has received the Master Agent 2 command to write S1. This command is not for this Master Agent. Therefore:
  L1 6M1L1 the command M2: write S1 in its register
  L2 6M1L2 has a blank in its register
  L3 6M1L3 has a blank in its register
  L4 6M1L4 has a blank in its register.

Slave Agent 1 has received blank information. Therefore:
  L1 6S1L2 has a blank in its register
  L2 6S1L2 has a blank in its register
  L3 6S1L3 has a blank in its register
  L4 6S1L4 has a blank in its register.

Master Agent 2 has received the M1: read S2 command. This command is not for this Master Agent. Therefore:
  L1 6M2L1 has the M1: read S2 command in its in its register
  L2 6M2L2 has a blank in its register
  L3 6M2L3 has a blank in its register
  L4 6M2L4 has a blank in its register.

Slave Agent 2 has received the T2 token. Therefore:
  L1 6S2L1 has the T2 token in its register
  L2 6S2L2 has a blank in its register
  L3 6S2L3 has a blank in its register
  L4 6S2L4 has a blank in its register.
  This completes the description of T-3.

TIME T4

Figure 7:
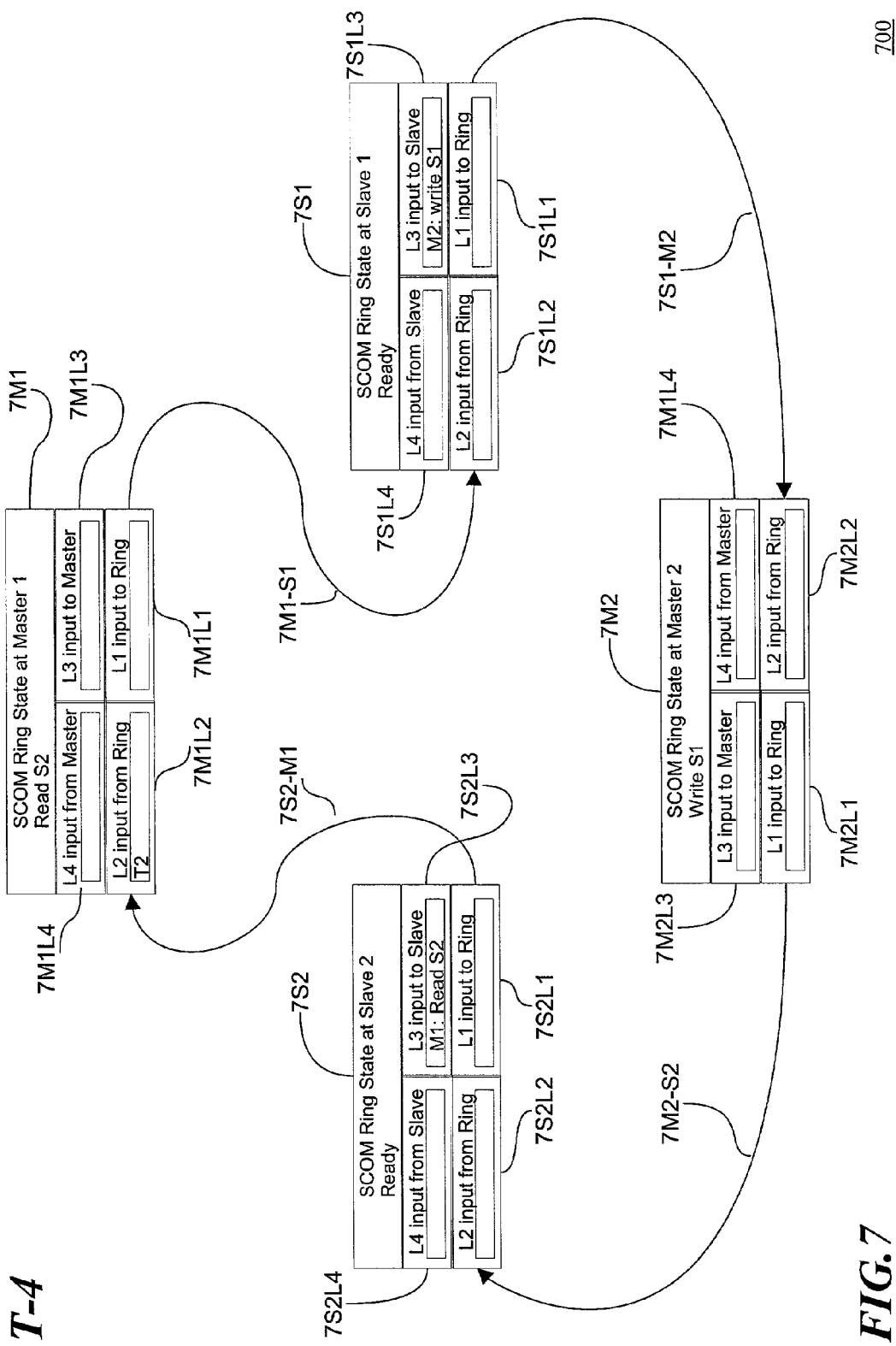

Referring to FIG. 7, shown are four bus 110 agents and the four interconnecting cables. At this time defined as T-4, the bus 110 agents have just completed another transmission of their individual content to the next bus 110 agent.

Master Agent 1 has received the T2. Therefore:
  L1 6M1L1 has the commanded M1: READ S2 in its register
  L2 6M1L2 has a bland in its register
  L3 6M1L3 has a blank in its register
  L4 6M1L4 has a blank in its register.

Slave Agent 1 has received the command M2: Write S1. This command is for this Slave Agent, the Write command from Master 2 will be performed. Therefore:
  L1 6S1L1 has nothing in its register
  L2 6S1L2 has a blank in its register
  L3 6S1L3 has the command M2: Write S1 in its register. This command is for this Slave Agent, therefore the Write command from Master Agent 2 will be performed.
  The results of the command will be put into the L4 register.
  L4 6S1L4 has a blank in its register.

Master Agent 2 has received blanks from the Slave Agent 1 bus 110 agent. Therefore:
  L1 6M2L1 has a blank in its register
  L2 6M2L2 has a blank in its register
  L3 6M2L3 has a blank in its register
  L4 6M2L4 has a blank in its register Slave Agent 2 has the command M1: Read S2 in its register. As this command is for this Slave Agent the Read command from Master Agent 1 will be performed. Therefore:
  L1 6S2L1 has a blank in its register
  L2 6S2L2 has a blank in its register
  L3 6S2L3 has the command M1: Read S2 in its register. As this command is for this Slave Agent the Read command from Master Agent 1 will be performed. The results of the command will be put into the L4 register.
  L4 6S2L4 has a blank in its register. This completes the description of T-4.

TIME T5

Figure 8:
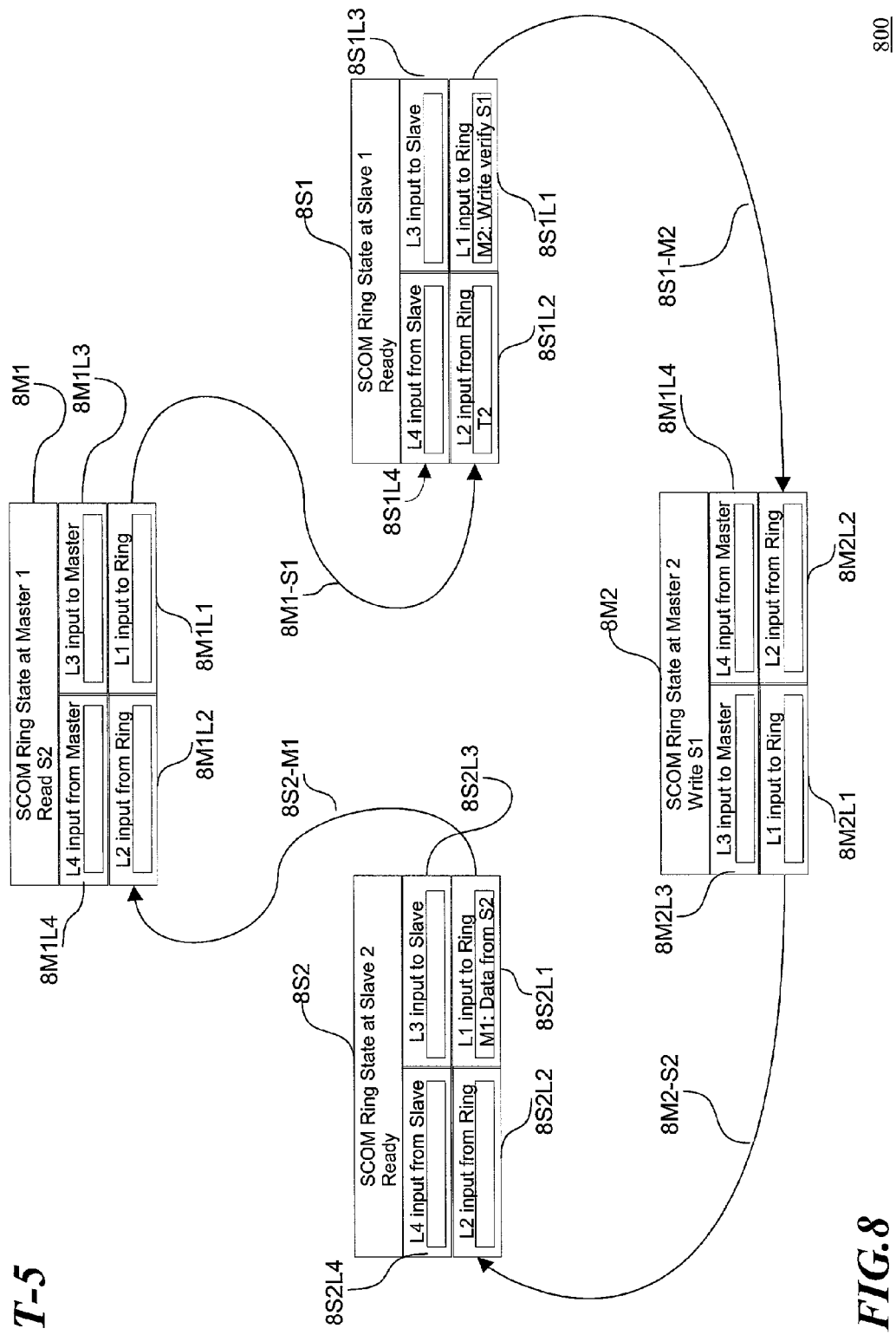

Referring to FIG. 8, shown are four bus 110 agents and the four interconnecting cables. At this time defined as T-5, the bus 110 agents have just completed another transmission of their individual content to the next bus 110 agent.

Master Agent 1 has received blanks from the Slave Agent 1 bus 110 Therefore:
  L1 8M1L1 has a blank in its register
  L2 8M1L2 has a blank in its register
  L3 8M1L3 has a blank in its register
  L4 8M1L4 has a blank in its register Slave Agent 1 has received the T2 token and placed the response M2: Write Verify S1 on the bus 110. Therefore:
  L1 8S1L1 has a blank in its register
  L2 8S1L2 has the token T2 in its register
  L3 8S1L3 has a blank. The response M2: Write verify S1 in L1
  L4 8S1L4 has a blank its register.

Master Agent 2 has received blanks from the Slave Agent 1 bus 110 Therefore:
  L1 8M2L1 has a blank in its register
  L2 8M2L2 has a blank in its register
  L3 8M2L3 has a blank in its register
  L4 8M2L4 has a blank in its register Slave Agent 2 did not receive any tokens but placed the response M1: Data from S2 on the bus 110. Therefore:
  L1 8S2L1 has the response M2: Write verify S1 in its register
  L2 8S2L2 has a blank in its register L3 8S2L3 has a blank in its register
L4 8S2L4 has a blank in its register.
This completes the description of T-5

TIME T6

Figure 9:
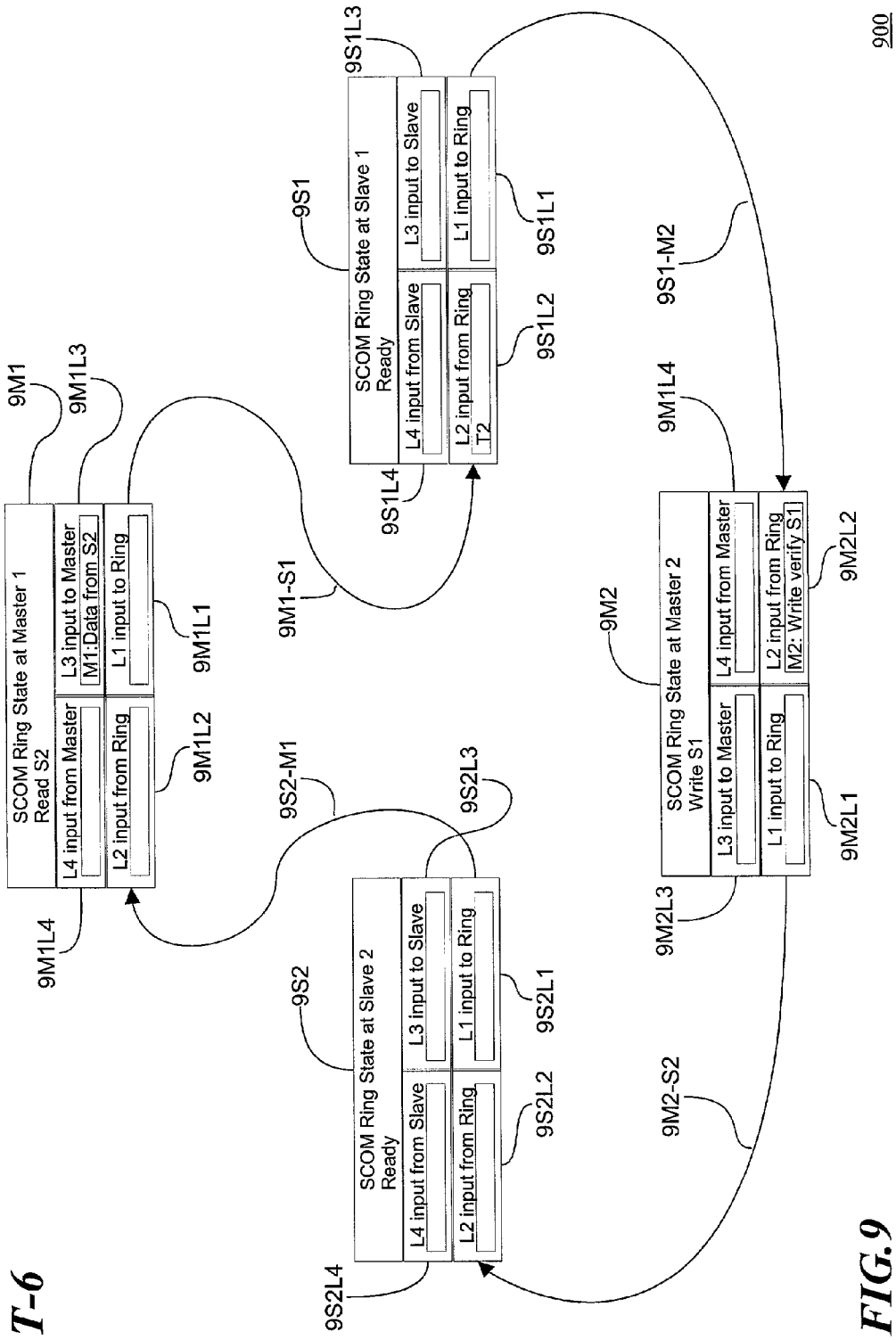

Referring to FIG. 9, shown are four bus 110 agents and the four interconnecting cables. At this time defined as T-6, the bus 110 agents have just completed another transmission of their individual content to the next bus 110 agent.

Master Agent 1 has received the results of its pending command. At this time the request by the Master Agent 1 bus 110 agent has been completed. It will put the T1 token on the bus 110. Therefore:
L1 9M1L1 has a blank in its register
L2 9M1L2 has a blank in its register
L3 9M1L3 has the response M1: Data from S2 in its register
L4 9M1L4 has a blank in its register
Slave Agent 1 has received the T2 token. Therefore:
L1 9S1L1 has a blank in its register
L2 9S1L2 has the token T2 in its register
L3 9S1L3 has a blank in its register
L4 9S1L4 has a blank in its register.

Master Agent 2 has received the results of its pending command. At this time the request by the Master Agent 2 agent has been completed. It will put the token on the bus 110. Therefore:
L1 9M2L1 has a blank in its register
L2 9M2L2 has the response M2: Write verify S1 in its register
L3 9M2L3 has a blank in its register
L4 9M2L4 has a blank in its register
Slave Agent 2 did not receive any tokens. Therefore:
L1 9S2L1 has a blank in its register
L2 9S2L2 has a blank in its register
L3 9S2L3 has a blank in its register
L4 9S2L4 has a blank in its register.

This completes the description of T-6, and of the subject invention's Token Ring simultaneous information transfer example.

SUMMARY OF THE RING RULES FOR EACH AGENT

In summary the following is a description of the rules and behaviors of each component on the ring with reference to the interface 200 of FIG. 2.

1. At initialization time, one Master Agent places n−1 tokens on the ring, where n is the total number of ring agents. A token is simply a short message, which indicates permission for a Master Agent to initiate a request. All of these tokens can be identical. In another embodiment, at initialization time all ring agents put a token on the ring except for the agent coupled to Access Macro.
2. The L2 latch has a single buffer. If the buffer is empty, a signal is presented to the upstream L1 that it is clear to send.
3. When any L4 has data to send, it indicates Valid, and either Request or Response as appropriate, to L1. It can send when it sees CTS from L1.
4. When the L1 latch sees a CTS (Clear To Send) signal from the downstream agent, it attempts to find data through the following ordered scheme:
   A) Looks for Valid from L4
      If the L4 indicates Valid and Response, then the L1 can set CTS to the L4 and take the data.
      If the L4 indicates Valid and Request, then the L1 can only set CTS to the L4 if the L1 sees CTS from the downstream agent and the L2 indicates Valid and Token. In this case, the L1 issues CTS to both L2 and L4. The L4 data is forwarded on the bus 110, and the L2 data (the token) is discarded.
      B) If the L2 indicates Valid, set CTS to the L2 and take the data.
5. After any L2 sends a response to an L3, it also forwards a token on the bus 110 (indicates Valid and Token to L1) (This is always a Master Agent completing a transaction and making the token available for use.
6. When any L3 receives a request, no special function must be performed. However, the attached logic must ensure that the L3 not receive another request until the L4 has transmitted the response. This is always a Slave Agent receiving a request. It has implicit permission to send, in order to complete the transaction. In one embodiment, the 3 does not assert CTS to the upstream L2 until the L4 is empty.

FLOW DIAGRAM FOR MASTER AGENT

Figure 10:
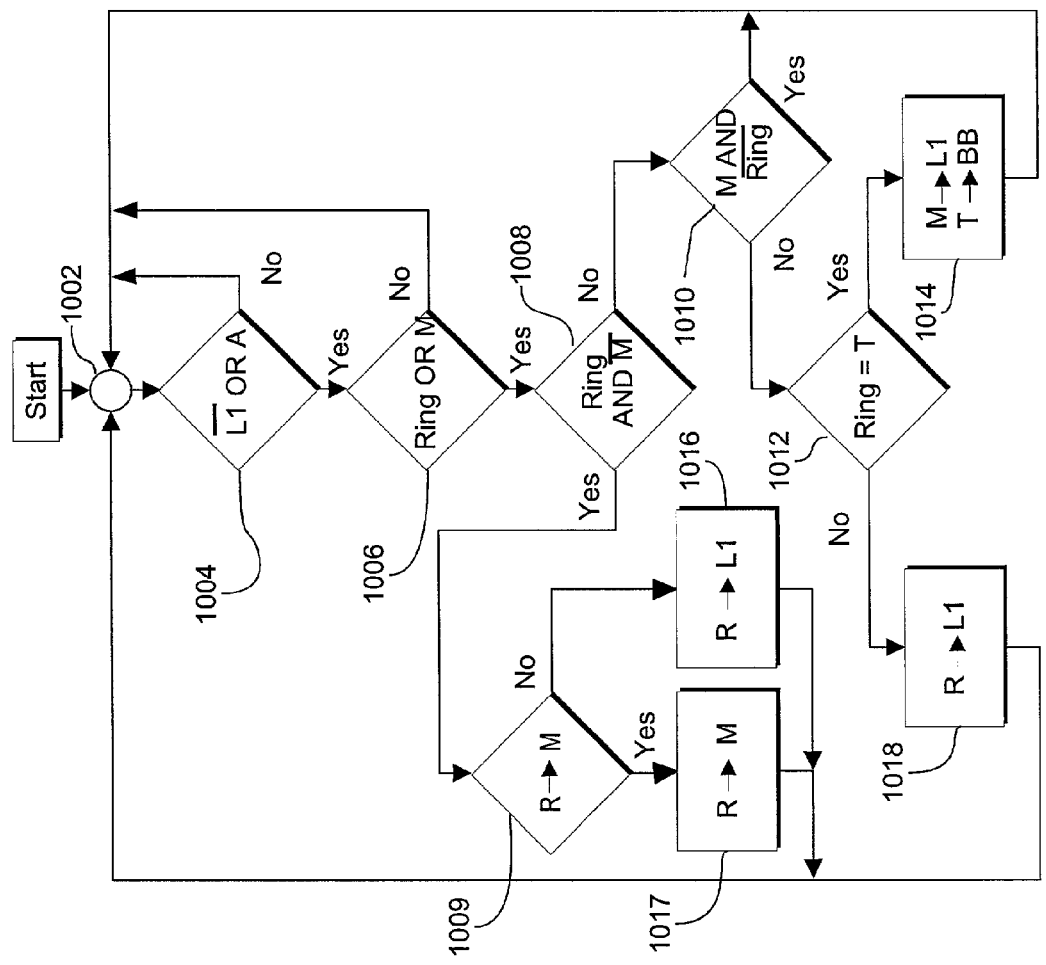
FIG. 10 is a flow diagram 1000 taken from the perspective of the L1 latch of a Master Agent, on the previously described bus or ring, according to the present invention.

FIG. 10 illustrates a flow diagram 1000 taken from the perspective of the L1 latch of a Master Agent, on the previously described bus or ring 110. At the top of the page is a summing node 1002 from which the process begins.

Below the summing node 1002 is a decision block, step 1004. If there is no data in the L1 and the next bus 110 agent does not send an advance line (A) then the ring 110 is indexed by returning to summing node 1002. If there is no data in the L1 or the next bus agent sends an advance line then the process continues at step 1006 below.

In step 1006, a determination is made as to if there is valid data from the bus 110 or this Master unit (102 and 106). If it is NOT from the bus 110 or the Master, then the ring 110 is indexed by returning to summing node 1002. If there is valid data from the ring 110 or from this Master then the process continues at step 1008.

In step 1008, a determination is made as to if the data is from the bus 110 and NOT from the Master. If the data 120 is from the bus 110 and NOT from the Master, in step 1008, then the process continues at step 1009. If the data 120 is NOT from the bus 110 or is from the Master, the process continues at step 1010.

In step 1009, a determination is made as to if the bus 110 data is for the Master Agent. If the bus 110 data is for the Master Agent, then the bus 10 data is passed to the Master, in step 1017, and the ring is indexed by returning to the summing node 1002. If the bus 110 data is NOT for the Master Agent, then the bus 110 data is passed to the L1, in step 1016, and the ring 110 is indexed by returning to the summing node 1002.

In step 1010, a determination is made as to if the data is from the Master and NOT the bus 110. If the data is from the Master and NOT the bus 110 then the ring 110 is indexed by returning to summing node 1002. Otherwise the data is NOT from the Master or it is from the bus 110 then the process continues at step 1012.

In step 1012 if the data from the bus 110 equals the token, then in step 1014 the Master request is placed into the L1, and the Token is decimated by being discarded in a bit bucket and ring 110 is indexed by returning to summing node 1002. Otherwise, if the data from the bus 110 does NOT equal the token, in step 1018, the bus 110 is passed to the L1 and the ring 110 is indexed by returning to summing node 1002.

FLOW DIAGRAM FOR SLAVE AGENT

Figure 11:
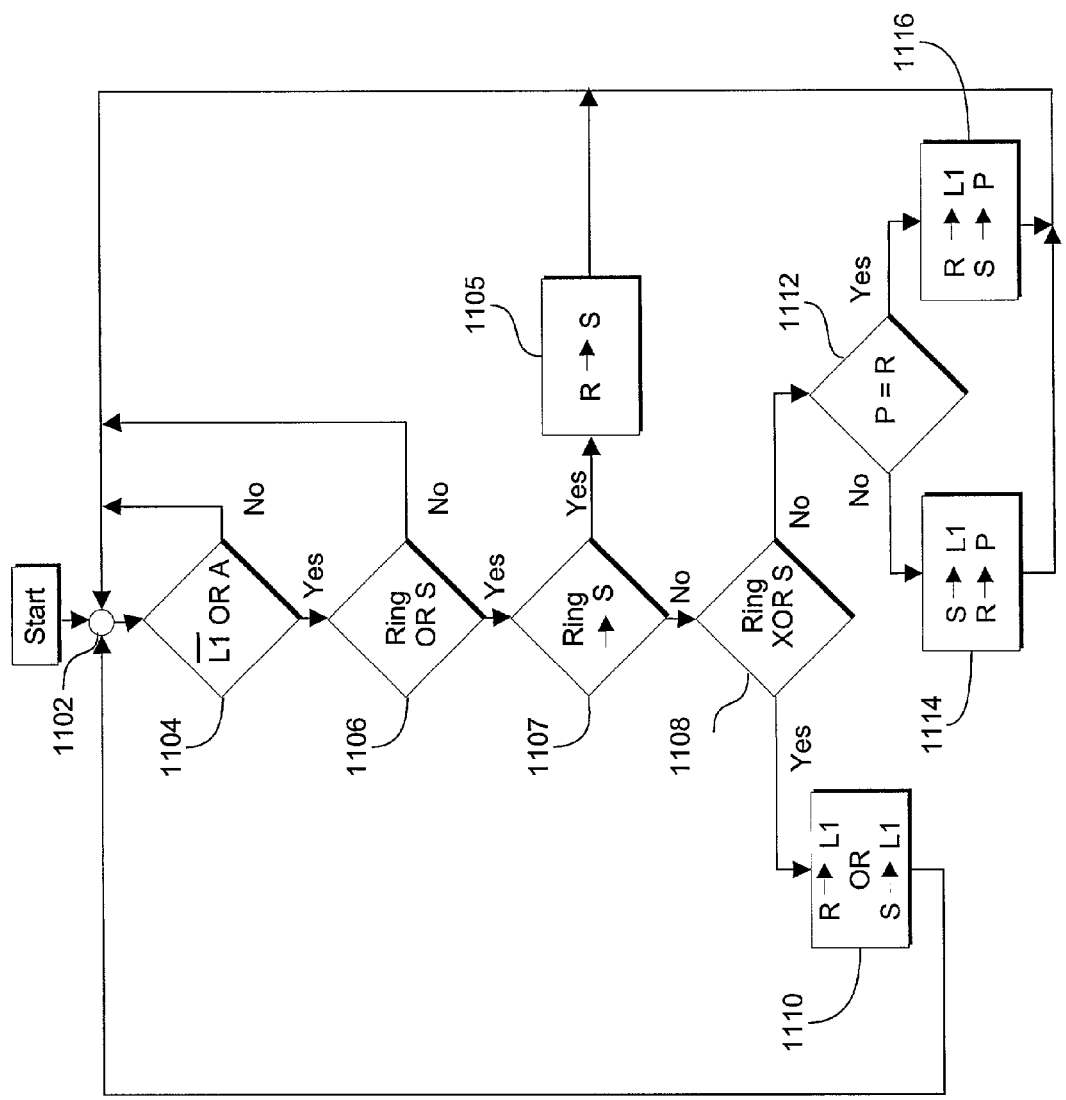
FIG. 11 is a programming flow diagram 1100 for a Slave Agent, according to the present invention.

Turning now to FIG. 11, shown is a programming flow diagram 1100 for a Slave Agent. At the top of the page is a summing node 1102. This point represents a cycle on the ring 110 if entered.

Below the summing node 1102 step is the first decision block NOT L1 or Advance in step 1104. If neither is valid the ring 110 is indexed by returning to summing node 1102. If either is valid, the process continues in step 1106.

In step 1106, a decision is made as to if the information is for the Slave Agent or to be passed on to the ring 110. If the data is NOT for the ring 110 or for the Slave Agent, then the ring 110 is indexed by returning to summing node 1102. If the information is either for the Ring or for the Slave Agent then the process continues in step 1107.

In step 1107, a decision is made as to if the information is for the Slave Agent. If the data is for the Slave Agent the ring 110 transfers the information into the Slave at step 1105 and the process continues at step 1102.

If the Ring information is not for the Slave Agent, in step 1108 the Ring information is eXclusively OR'ed (i.e., XOR) with the Slave tag. If the information is either for the ring OR information is being presented from the Slave then in step 1110 the data is transferred to the L1 or the Slave response is transferred to the L1 and the ring is indexed by returning to summing node 1102. Otherwise, if the information is both from the ring AND it is for the Slave Agent then the process continues at step 1112.

In step 1112, priority (P) is compared to the ring information. If the priority matches then in step 1114 the Ring information is put into the L1 and the Slave information is processed after the ring is indexed by returning to summing node 1102. Otherwise, if the priority does NOT equal the Ring information in step 1112, the Slave information is put into the L1 and the Ring information will be processed after the ring is indexed 1114. It should be understood that steps 1112 through 1116 allow the priority on the Slave Agents 104 and 109 to be set in a round-robin method, where the priority is switched between the ring 110 and the Slave during each cycle.

DISCUSSION OF HARDWARE AND SOFTWARE IMPLEMENTATION OPTIONS

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are NOT limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

NON-LIMITING EXAMPLES

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for simultaneous communication over a closed loop bus to permit at least two master agents and slave agent on the bus to communicate, the method comprising:

coupling at least one slave agent with at least two master agents including a first master agent and a second master agent on a closed loop bus in a ring network for simultaneous communications, wherein the simultaneous communications on the bus permits two or more of the master agents and the slave agent on the bus to communicate at one time independent of a clock signal;

determining if there is data from at least one of the master agents, and if there is data from the at least one of the master agents then performing:

testing if the data from the closed loop bus is a token, wherein the token is used for complete roundtrip communication transactions so as to avoid deadlock on the closed loop bus;

in response to the data from the closed loop bus being a token, then moving the data from the at least one of the master agents to the closed loop bus and discarding the token from the closed loop bus; and in response to the data not being a token from the closed loop bus, then moving the data from the input of the closed loop bus to the output of the closed loop bus;

wherein in response to the data not being from the at least one of the master agents and the data is from the closed loop bus, then moving the data from the input of the closed loop bus to the output of the closed loop bus.

2. The method according to claim 1, the method further comprising:
determining at least one of
if there is data from the closed loop bus, and
if there is data from the at least one of the master agents.

3. The method according to claim 1, the method further comprising:
determining at least one of if there is no data on the output and if an advance line is asserted and in response to the at least one of no data on the output and an advance line is asserted then determining at least one of
if there is data from the closed loop bus, and
if there is data from the at least one of the master agents.

4. The method according to claim 1, the method further comprising:
determining if the at least one of the master agents is coupled to an access macro and in response to the at least one of the master agents is coupled to an access macro placing tokens on the closed loop bus, where a maximum number of tokens on the closed loop bus is set equal to a total number of master agents plus the total number of slave agents less one.

5. A method for simultaneous communication over a closed loop bus, the method on a slave agent having an input and an output to the closed loop bus comprising:
coupling at least one slave agent with at least two master agents including a first master agent and a second master agent on a closed loop bus in a ring network for simultaneous communications, wherein the simultaneous communications on the bus permits two or more of the master agents and the slave agent on the bus to communicate at one time independent of a clock signal;
determining if there is data from the closed loop bus or from the at least one slave,
in response to being data from the closed loop bus but not from the at least one slave then moving the data from the closed loop bus to the output, and
in response to being data from the at least one slave but not the closed loop bus then moving the data from the at least one slave to the output;
determining if there is data both from the closed loop bus and the at least one slave and in response to being data from both the bus and the at least one slave then:
if the closed loop bus has priority then moving the data from the closed loop bus to the output and setting the priority to the at least one slave; and
if the closed loop bus does not have priority then moving the data from the at least one slave to the output and setting the priority to the closed loop bus.

6. The method according to claim 5, the method further comprising:
determining at least one of
if there is data from the closed loop bus, and
if there is data from the at least one slave.

7. The method according to claim 5, the method further comprising:
determining at least one of if there is no data on the output or if an advance line is asserted and in response to the at least one of no data on the output and an advance line is asserted then determining at least one of
if there is data from the closed loop bus, and
if there is data from the at least one slave.

8. A method for simultaneous communication over a closed loop bus to permit at least two master agents and slave agent on the bus to communicate, the method comprising:
coupling at least one slave agent with at least two master agents including a first master agent and a second master agent on a closed loop bus in a ring network for simultaneous communications, wherein the simultaneous communications on the bus permits two or more of the master agents and the slave agent on the bus to communicate at one time independent of a clock signal;
receiving a reset command;
determining after being reset if at least one of the master agents is coupled to an access macro and in response to the at least one of the master agents is coupled to the access macro then placing n−1 tokens on the closed loop bus, where n is the total number of master agents and slave agents communicating on the closed loop bus, and wherein the token is used for complete roundtrip communication transactions so as to avoid deadlock on the closed loop bus.

9. A data communications network for simultaneous communications between two or more agents comprising:
at least one agent designated as a slave agent coupled to a closed loop communications bus in a ring network for simultaneous communications;
at least two agents designated as a first master agent and a second master agent respectively, coupled to the closed loop communications bus;
an interface to each of the master agents with an input from the closed loop bus and an output to the closed loop bus, the interface comprising a plurality of latches for testing if there is data, and
in response to there being data from at least one of the master agents then testing if the data from the closed loop bus is a token, wherein the token is used for complete roundtrip communication transactions so as to avoid deadlock on the closed loop bus;
in response to the data from the closed loop bus is a token, then moving the data from the master to the closed loop bus and discarding the token; and
in response to the data is not a token from the closed loop bus, then moving the data from the input of the closed loop bus to the output of the closed loop bus;
in response to the data is not from the at least one of the master agents and the data is from the closed loop bus, then moving the data from the input of the closed loop bus to the output of the closed loop bus.

10. The data communications network according to claim 9 further comprising:
an interface on each slave agent with an input to the closed loop bus and an output to the closed loop bus, the interface comprising a plurality of latches for testing if there is data from the closed loop bus or from the slave agent and if there is data from the closed loop bus but not from the slave then moving the data from the closed loop bus to the output and if there is data from the slave but not from the closed loop bus then moving the data from the slave to the output;
wherein the plurality of latches tests if there is data both from the closed loop bus and data from the slave and in response to there is data from both the closed loop bus and from the slave then testing if the closed loop bus has priority and:
in response to the closed loop bus having priority then moving the data from the closed loop bus to the output and setting the priority to the slave; and in response to the closed loop bus does not having priority then moving the data from the slave to the output and setting the priority to the closed loop bus.

11. The data communications network, according to claim 10, wherein the data further includes control, data and parity data.

12. The data communications network, according to claim 10, wherein at least one of the communication agents is coupled to a first brand of computer and at least one of the communications agents is coupled to a second brand of computer so as to form a heterogeneous environment.

13. The data communications network, according to claim 10, wherein the closed loop bus is selected from a group of buses consisting of wire, wireless and infrared.

14. The data communications network, according to claim 9, wherein the slave agent includes:
an interface with an input from the closed loop bus and an output to the closed loop bus, the interface comprising a plurality of latches for testing if the data is for the slave agent and in response to the data being for the slave agent then transferring the data to the slave.

15. The data communications network, according to claim 9, wherein the interface to each of the master agents further comprises a plurality of latches for testing if the data is for the at least one of the master agents and if the data is for the at least one of the master agents, then passing the data to the at least one of the master agents.

16. A computer readable medium containing programming instructions for simultaneous communication over a closed loop bus to permit at least two master agents and slave agent on the bus to communicate, the programming instructions comprising:
coupling at least one slave agent with at least two master agents including a first master agent and a second master agent on a closed loop bus in a ring network for simultaneous communications, wherein the simultaneous communications on the bus permits two or more of the master agents and the slave agent on the bus to communicate at one time independent of a clock signal;
receiving a reset command;
determining after being reset if at least one of the master agents is coupled to an access macro and in response to the at least one of the master agents is coupled to the access macro then placing n−1 tokens on the closed loop bus, where n is the total number of master agents and slave agents communicating on the closed loop bus, and wherein the token is used for complete roundtrip communication transactions so as to avoid deadlock on the closed loop bus.

17. A computer readable medium containing programming instructions for simultaneous communication over a closed loop bus to permit at least two master agents and slave agent on the bus to communicate, the programming instructions comprising:
coupling at least one slave agent with at least two master agents including a first master agent and a second master agent on a closed loop bus in a ring network for simultaneous communications;
determining if there is data from at least one of the master agents, and if there is data from the at least one of the master agents then performing:
testing if the data from the closed loop bus is a token, wherein the token is used for complete roundtrip communication transactions so as to avoid deadlock on the closed loop bus;
in response to the data from the closed loop bus being a token, then moving the data from the at least one of the master agents to the closed loop bus and discarding the token from the closed loop bus; and
in response to the data not being a token from the closed loop
bus, then moving the data from the input of the closed loop bus to the output of the closed loop bus;
wherein in response to the data not being from the at least one of the master agents and the data is from the closed loop bus, then moving the data from the input of the closed loop bus to the output of the closed loop bus.

* * * * *